R. C. HILTON.
SAFETY CRANKING DEVICE.
APPLICATION FILED JAN. 10, 1910.
1,013,878.
Patented Jan. 9, 1912.
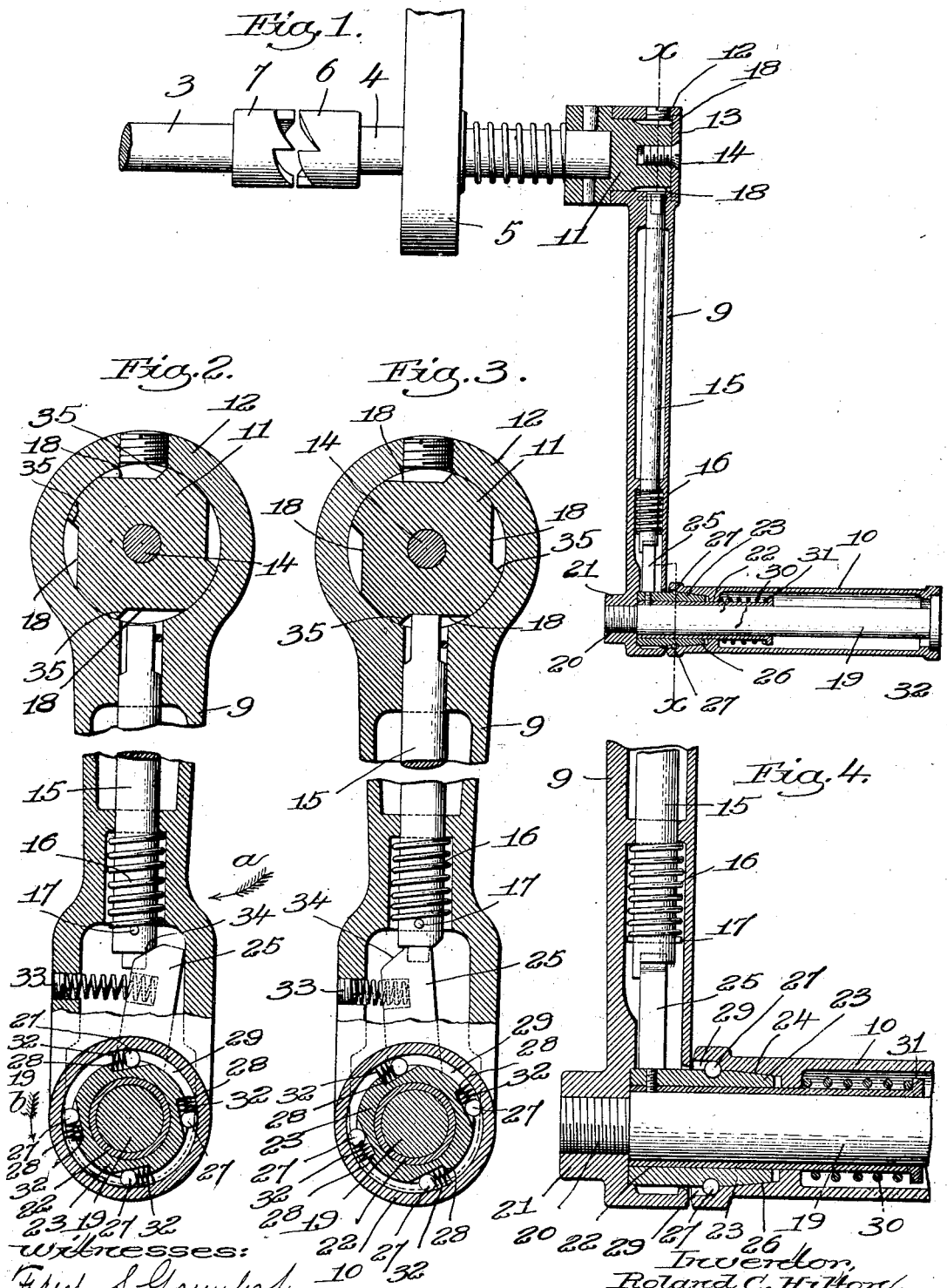

UNITED STATES PATENT OFFICE.

ROLAND C. HILTON, OF QUINCY, MASSACHUSETTS, ASSIGNOR TO HILTON MANUFACTURING COMPANY, OF BOSTON, MASSACHUSETTS, A CORPORATION OF MASSACHUSETTS.

SAFETY CRANKING DEVICE.

1,013,878.  Specification of Letters Patent.  Patented Jan. 9, 1912.

Application filed January 10, 1910. Serial No. 537,130.

*To all whom it may concern:*

Be it known that I, ROLAND C. HILTON, a citizen of the United States, residing at Quincy, county of Norfolk, and State of Massachusetts, have invented an Improvement in Safety Cranking Devices, of which the following description, in connection with the accompanying drawing, is a specification, like characters on the drawing representing like parts.

This invention relates to cranking devices for internal combustion engines and has for one of its objects to provide a novel cranking device in which the means for connecting the crank handle to, and disconnecting it from, the starting crank shaft, or other shaft of the engine, are located within the crank handle so that to apply the device to an automobile or motor boat does not require the use of extra attachments or brackets to be secured to the frame, but merely involves the application of my improved crank handle directly to the shaft.

Another object of my invention is to provide a novel cranking device in which the crank handle is normally disconnected from the shaft on which it is supported, but which is provided with means whereby said crank handle will be automatically connected to the shaft by a turning movement of the crank handle in one direction.

Another object of the invention is to provide a crank handle which will be automatically disconnected from the shaft, thereby permitting the shaft to rotate freely in either direction, by a backward movement of the crank handle or a movement in the opposite direction to that which couples the crank handle to the shaft.

Still another object of the invention is to provide a construction whereby the automatic coupling of the crank handle to the shaft may be secured by a turning movement of the handle portion thereof.

Other objects of the invention will be more fully hereinafter described and then pointed out in the appended claims.

Referring to the drawings, Figure 1 is a sectional view of a crank handle embodying my invention, said view showing the starting crank shaft and a portion of the engine shaft; Fig. 2 is an enlarged section on the line $x$—$x$, Fig. 1, showing the normal position of the parts with the crank handle disconnected from the shaft; Fig. 3 is a similar view showing the crank handle connected to the crank shaft; Fig. 4 is an enlarged sectional view of a portion of the crank handle.

3 designates an engine shaft of an internal combustion engine, such as may be used for driving an automobile, motor boat or for some other purpose, and 4 designates a starting crank shaft which is journaled in suitable bearings 5 and which is provided with the usual clutch 6 adapted to engage a corresponding clutch 7 on the engine shaft. These parts may be of any suitable or usual construction and form no part of my present invention.

Carried by the starting crank shaft is a crank handle which involves a crank arm 9 and a handle portion 10. This crank handle is normally disconnected from the starting crank shaft, that is, is loosely mounted thereon so that the shaft can rotate in either direction relative to the crank handle. The crank handle is so constructed, however, that a turning movement thereof in a direction adapted to start the engine will automatically couple said crank handle to the shaft so that the engine will be started in the usual way, while if a back kick should occur or for any other reason the crank handle should be turned backwardly slightly, said crank handle will become automatically disconnected from the starting crank shaft, thus permitting the engine shaft to rotate freely in either direction without giving any movement to the crank handle. The crank handle may be mounted directly on the starting shaft 4 or may be mounted on a head 11 secured to the shaft, the latter being the construction herein shown. The arm 9 of the crank handle is provided with the eye or loop portion 12 which embraces the head 11 and is held thereto in some suitable way, as by means of the clamping plate 13 which engages the outer face of the loop and is secured to the head by means of a screw 14. Associated with the crank handle is a locking member or pawl 15 which is adapted to move longitudinally of the crank arm 9 and in one position, as shown in Fig. 3, is arranged to engage the head 11 and lock the crank arm thereto. The locking member 15 may conveniently be, and preferably is, situated within the crank arm 9, the latter being provided with a central bore in which the locking member is received. Said locking member is normally maintained in its inoperative position, as shown in Fig. 2, by means of a spring 16 which is received in a recess in the crank handle and bears at one end against a collar or pin 17 carried by the locking member.

I have herein shown the head 11 as provided with a plurality of flattened portions 18 adapted to be engaged by the end of the locking member 15 when the latter is projected, as shown in Fig. 3, thereby to lock the crank arm to the head. The locking member 15 is thrown forward into locking position by the turning movement of the handle 10 and the arrangement is such that the turning movement which is naturally given to the crank handle in starting the engine operates to throw said locking member into its operative position. In the embodiment herein shown the crank arm 9 has extending therefrom a pin 19 on which the handle 10 is loosely mounted. This pin is shown as screw-threaded at one end, as at 20, and said screw-threaded end is screwed into a boss 21 formed on the crank arm. Loosely mounted on the pin 19 is a sleeve 22 having associated therewith a bushing 23 provided with a conical portion 24. Projecting laterally from the sleeve and bushing is an arm 25 adapted to engage the end of the locking member 15 when the sleeve and bushing are turned and thereby project the locking member into its operative position. The handle 10 is loosely mounted on the sleeve 22 and is provided with an interior conical surface 26 adapted to fit the conical surface 24. A pawl and ratchet device is situated between the bushing 23 and the handle 10 which permits the handle to rotate freely in one direction relative to the sleeve, but prevents rotation thereof in the opposite direction. This pawl and ratchet device may conveniently be in the form of balls 27 that are confined partially in tapering recesses 28 formed in the bushing 23 and partially in a groove 29 formed in the handle. A spring 30 bears at one end against the handle and at the other end against a flange 31 formed on the sleeve 22 and tends normally to keep the conical friction surfaces 24 and 26 in engagement. A spring 33 acts against the arm 25 and normally tends to move the arm into the position shown in Fig. 2. Each ball 27 is acted on by a spring 32, as shown.

When the parts are in the position shown in Fig. 2, the shaft 4 and the head 11 may be turned freely in either direction without giving movement to the crank handle. When it is desired to crank the engine, the operator grasps the handle 10 and pushes inwardly or to the left Fig. 1 in usual manner in order to bring the clutches 6 and 7 into engagement, and then turns the crank forward in usual manner. When the operator begins to turn the crank forward or in the direction of the arrow $a$, in Fig. 2, the grip of the operator on the handle 10 will naturally tend to turn said handle in the direction of the arrow $b$ relative to the arm 9, and the parts are so arranged that this movement of the handle will operate to throw the locking member 15 forward into its operative position, as shown in Fig. 3, for it will be observed that when the operator starts cranking the conical friction surfaces 24 and 26 are in engagement and the turning movement of the handle 10 will be communicated therethrough to the sleeve 22 and bushing 23, and will thus carry the arm 25 from the position shown in Fig. 2 to that shown in Fig. 3. The end of the arm is preferably beveled slightly, as at 34, and the engagement of this beveled surface with the end of the locking member 15 will throw it forwardly into locking engagement with the head 11. When the arm 25 is brought into its operative position, as shown in Fig. 3, then during further turning movement of the crank the handle 10 will slip on the bushing 23. So long as the operator is turning the crank forwardly, said crank will be locked to the handle. Whenever the crank handle is moved backwardly, however, the handle 10 will be turned in the direction opposite to the arrow $b$ relative to the crank arm, and during such turning movement the arm 25 will be disengaged from the end of the locking member 15 and the spring 16 will act to retract the latter, thus disconnecting the crank arm from the head 11. This movement of the arm 25 is secured partly by the action of the spring 33 and partly by the pawl and ratchet connection between the handle 10 and the sleeve 23. The latter is provided so as to make the disconnection of the crank arm sure and positive, and it is so arranged, as will be observed, that a backward turning movement of the handle 10 will grip the handle to the sleeve 23 and thus turn said sleeve backwardly. If, therefore, a back kick should occur, the initial backward movement of the crank handle will automatically disconnect it from the head 11, thus permitting the engine shaft to rotate backwardly without giving any movement to the crank handle. I prefer to make the head 11 with the inclined surfaces 35 at the end of each flattened portion 18 and to make these inclined portions 35 at such an angle relative to the inclined portion 34 that the parts will be disconnected without any apparent backward movement to the crank handle. If at any time the operator should release his grip on the handle 10 the spring 33 will operate to throw the arm 25 into the position shown in Fig. 2, thus allowing the crank handle to be automatically disconnected from the head 11. My improved cranking device is, therefore, a safety device in every respect, for it will not only prevent an injury to the operator due to a back kick, but if the operator should for any reason release his grip on the handle 10 the crank handle will be automatically disconnected from the head 11, thus preventing any accident. Furthermore, it will be noted that the operative parts are located entirely within the crank arm and handle, and the application of the cranking device to an engine does not involve securing to the engine frame any auxiliary parts adapted to effect the disengagement of the clutches 6 and 7. The device is self-contained and the head 11 can be readily applied to the end of any crank shaft whether it be a starting crank shaft disconnected from the engine shaft, or the engine shaft itself.

While I have illustrated one embodiment of my invention I do not wish to be limited to the constructional details shown.

Having fully described my invention, what I claim as new and desire to secure by Letters Patent is:—

1. In a safety cranking device, the combination with a shaft, of a crank arm thereon for giving turning movement thereto, a locking member situated within the crank arm, a handle connected to said arm for turning movement relative thereto, a finger associated with the handle and provided with a cam surface at its end to engage the end of the locking member, turning movement of the handle operating to carry the finger into line with the locking member and thereby force the latter into locking engagement with the shaft.

2. In a safety cranking device, the combination with a shaft, of a crank arm thereon for giving turning movement thereto, a locking member situated within the crank arm, a handle connected to said arm for turning movement relative thereto, a finger associated with the handle and provided with a cam surface at its end to engage the end of the locking member, turning movement of the handle operating to carry the finger into line with the locking member and thereby force the latter into locking engagement with the shaft, and a spring acting on said finger to throw it out of line with the arm when the handle is released.

3. In a safety cranking device, the combination with a shaft, of a crank arm loosely mounted thereon, a spindle extending from the end of the arm, a handle mounted on the spindle for turning movement, a locking member situated within the crank arm, and a finger loosely mounted on the spindle and frictionally connected with the handle whereby turning movement of the handle will bring the finger into engagement with the locking member thereby to lock the crank arm to the shaft.

4. In a safety cranking device, the combination with a shaft, of a crank arm loosely mounted thereon, a locking member situated within the crank arm, a spindle extending from the crank arm, a handle loosely mounted on the spindle, a sleeve also loosely mounted on the spindle and having frictional engagement with the handle, and a finger carried by the sleeve and adapted to engage the locking member and move it into locking position when the handle is turned.

5. In a safety cranking device, the combination with a shaft, of a crank arm loosely mounted thereon, a locking member situated within the crank arm, a spindle extending from the crank arm, a handle loosely mounted on the spindle, a sleeve also loosely mounted on the spindle and having frictional engagement with the handle, a finger carried by the sleeve and adapted to engage the locking member and move it into locking position when the handle is turned, and means to lock positively said sleeve to the handle when the latter is turned backwardly.

6. In a safety cranking device, the combination with a shaft, of a crank arm for turning the shaft, a locking member situated within the crank arm and adapted to have locking engagement with the shaft, a spindle extending from the crank arm, a handle loosely mounted on the spindle, a finger also loosely mounted on the spindle and adapted to engage the locking member, and means interposed between said finger and handle which permits the handle to be turned in one direction independently of the finger but which locks the two together for turning movement in the opposite direction.

In testimony whereof, I have signed my name to this specification, in the presence of two subscribing witnesses.

ROLAND C. HILTON.

Witnesses:
LOUIS C. SMITH,
FREDERICK S. GREENLEAF.